United States Patent
Taylor et al.

[11] Patent Number: 5,738,903
[45] Date of Patent: Apr. 14, 1998

[54] GLASS COATING COMPOSITION AND METHOD OF APPLICATION

[75] Inventors: George S. Taylor; Joel S. Miller, both of Salt Lake City, Utah

[73] Assignee: Diamond Seal, Inc., Salt Lake City, Utah

[21] Appl. No.: 807,664

[22] Filed: Feb. 27, 1997

[51] Int. Cl.$^6$ .......................................... B05D 3/12
[52] U.S. Cl. ................. 427/8; 427/358; 427/369; 427/387
[58] Field of Search .................. 427/8, 355, 356, 427/358, 369, 387

[56] References Cited

U.S. PATENT DOCUMENTS

| | | |
|---|---|---|
| 2,612,458 | 9/1952 | Stedman . |
| 2,923,653 | 2/1960 | Matlin et al. . |
| 2,962,390 | 11/1960 | Fain et al. . |
| 3,244,541 | 4/1966 | Fain . |
| 3,442,664 | 5/1969 | Heine . |
| 4,874,431 | 10/1989 | Fey et al. ..................... 106/2 |
| 5,039,555 | 8/1991 | Ando et al. ................. 427/131 |
| 5,540,946 | 7/1996 | Devries et al. ............... 427/8 |

*Primary Examiner*—Erma Cameron
*Attorney, Agent, or Firm*—Trask, Britt & Rossa

[57] ABSTRACT

A coating composition of an alkyl alkoxy silane reacted with the surface of a glass substrate is disclosed. The coating provides water repellency, durability and ease of cleaning to a glass or other siliceous surface. The coating is formed by applying an excess of an alkoxy solution containing sulfide acid to a glass surface. After a continuous film of the alkoxy solution has reacted with the glass substrate to cover completely a surface of the substrate, the excess solution is removed. Failure to remove the excess solution immediately upon the formation of the reacted film results in the formation of a greasy, deleterious film which is difficult to remove. Proper removal of the excess coating solution provides a transparent reacted film which protects the substrate. A method for determining the appropriate end point for removing excess solution is disclosed.

9 Claims, No Drawings

GLASS COATING COMPOSITION AND METHOD OF APPLICATION

BACKGROUND OF THE INVENTION

1. Field of the Invention

The instant invention relates to the formation of a protective coating on a siliceous substrate through the use of an alkoxy silane to provide a weather-resistant, easily cleaned surface.

2. State of the Art

Various silane formulations and compositions have been utilized to provide various types of coatings upon glass or other vitreous or siliceous surfaces. In U.S. Pat. No. 3,244,541 (Fain et al.), a dimethyl diethoxy silane is disclosed as one which, in conjunction with a minute amount of sulfuric acid, readily forms a protective coating on a vitreous surface.

In U.S. Pat. No. 3,442,664, a polymeric fluorine-containing, hydrolytically-stable organo siloxane having a viscosity from 500 to 500,000 centipoise is utilized as a coating composition. Earlier patents such as those to Stedman (U.S. Pat. No. 2,923,653 and U.S. Pat. No. 2,612,458) and Fain (U.S. Pat. No. 2,962,390) describe various silane wax compositions. The composition utilized in Fain et al. (U.S. Pat. No. 3,244,541) is stated to form a transparent coating but that if a significant amount of sulfuric acid, for example above 0.75% by weight, is utilized, the coating is "greasy." Apparently unknown to Fain, it has been discovered that this greasiness also occurs with formulations containing less acid under varying conditions of humidity, temperature and time.

The work of Fain et al. does not describe the various humidity conditions under which the coating compositions of Fain et al. were applied. It has been discovered that at high humidity, the problem with a greasy film is much less likely to occur. In the work of Fain et al., if it was done in New York, the headquarters of the corporation to which the patent is assigned, then the coatings would generally have been applied in relatively high humidity conditions.

It has recently been found that there is less problem in obtaining a useful film during application in high humidity conditions. However, application of compositions of Fain et al. in low humidity applications results in greasy films. This greasiness is extremely difficult to remove and the greasy appearance is unacceptable as a coating for glass substrates in which good optical properties are desired. Thus, windows of buildings cannot be properly coated unless this greasy condition is prevented from occurring.

The formation of non-greasy coatings must be obtainable with every application if a coating system is to be useful in outdoor and indoor environments where various conditions of humidity, high or low, and temperature, may be encountered. In most situations, humidity control is not possible during the coating process and may vary during the course of a day or several days where all the windows of a large building, for example, are being coated.

SUMMARY

The instant invention relates to alkoxy silane coating compositions and to techniques for applying an alkoxy silane coating to a vitreous or siliceous surface so that a non-greasy film is formed under any condition of humidity and is adherent to said surface. The invention further involves the determination of the proper end point at which excess coating solution is to be removed. Allowing excess solution to remain on the surface under certain humidity conditions results in the formation of an unacceptable, greasy film wherein the whole coating must be removed by time-consuming abrasion and the surface cleaned and the application technique redone.

A "greasy film" or "greasy appearing film," for purposes of this invention, is a film which exhibits tackiness, non-uniform light transmissivity and/or nonuniformity of reflected light.

The attainment of a proper coating is one which is essentially a monolayer of an alkoxy silane bonded to a vitreous substrate. The greasy condition generally occurs, it is believed, through homopolymerization of excess silane whereby a nontransparent, greasy film occurs. This homopolymerized film, as could be expected, is very difficult to remove and is unacceptable in appearance and function. The alkoxy silane film reacted with the glass is typically a clear, transparent film, although it may be tinted or colored. The usual vitreous surface is glass and the film's excellent transparency is very desirable for windows, mirrors and like surfaces. The film also provides an easily cleaned surface on tile and other vitreous surfaces.

The proper end point may be detected by determining the change in viscosity of the coating by optical or other techniques described herein to determine the precise moment when the excess coating solution must be removed. Application of the alkoxy coating without the use of a good end point determiner becomes a hit or miss proposition under various conditions of temperature, humidity, etc. resulting in unacceptable coatings and a very uneconomic process.

The invention, in summary, is the application of an excess amount of a silane compound having at least one reactive alkoxy site, although preferably two or three such sites, to a vitreous or siliceous substrate. The end point to be determined is when the silane compound has formed at least a complete reacted monolayer on the substrate and initial homopolymerization of the silane compound has started. At such time the excess silane compound is then quickly removed so that all unreacted silane and any minor amount of homopolymerized silane material are promptly removed to provide an optical-quality layer of silane reacted with the substrate surface.

The proper end point may be determined by regularly testing the viscosity to determine that viscosity increase which indicates the initiation of homopolymerization. Also, since the film becomes greasy in appearance upon homopolymerization, the coating solution may be observed with an optical dosimeter to determine the initial light transmission reduction or light diffusion of the film so that the excess coating solution may be removed before such changes in optical properties are actually observable to the unaided eye.

These end point determinations are essential because the elapsed time from initial application of the coating composition at which the end point occurs will vary depending upon humidity, temperature and other conditions, including substrate conditions. The proper end point determination is one which is independent of such variables and can be rigorously obtained, for example, by a light dosimeter, viscosimeter or marking and timing technique, as described hereinafter, which any trained technician could perform accurately. Hit and miss methods are dependent upon the art of the application technician in having a "feel" for when a film may or may not be properly cured whereby the excess coating solution is removed at the proper time so that the reacted film is actually on the glass and homopolymerization of the excess silane has not proceeded to a deleterious point.

DETAILED DESCRIPTION OF THE ILLUSTRATED EMBODIMENT

A transparent, weather-resistant coating of an alkoxy silane on a siliceous substrate can be reliably formed under various conditions of humidity and temperature by application techniques which include determination of the proper moment when excess silane is to be removed.

Coating solutions useful in forming the weather-resistant films in the instant invention utilize an alkyl alkoxy silane, preferably a dimethyl diethoxy silane, although various other alkyl alkoxy silanes, dialkoxy and trialkoxy are useful, such as trimethyl alkoxy silane, triethyl alkoxy silane and trialkoxy silanes such as methyl or ethyl triethoxy silane and the like. Preferably dialkoxy silanes are utilized. The alkoxy moiety can include methoxy, ethoxy, propoxy (any isomer), butoxy (any isomer), etc. The alkyl moiety is typically a lower alkyl group such as methyl, ethyl, propyl or butyl group. Additionally, an aryl group such as phenyl and substituted phenyl can be utilized in conjunction with or in replacement of an alkyl group.

The alkoxy silane is mixed with a small amount of sulfuric acid, generally from about 0.2% to 0.5% by weight sulfuric acid, although other acids may be utilized. A preferred composition has about 0.25% sulfuric acid. A coating solution is formed of the alkoxy silane and acid and thoroughly mixed generally in the absence of a humid atmosphere and stored in the absence of significant humidity. The solution is very reactive with water and it is generally desirable to maintain the solution in a moisture-free environment prior to its use as a coating composition.

Siliceous surfaces such as glass to be coated are generally cleaned with alcohol and then with water. If the surface is an older, weathered surface, then a more rigorous cleaning may be required. Generally, for newer surfaces, cleaning with any lower alkyl alcohol, especially denatured alcohol, and water is sufficient. Alcohol is utilized to remove any grease or organic matter. Also, it is generally desirable to hydrate the substrate to which the coating solution is to be applied before the coating process takes place. A thin coating of water is generally believed to assist in the reaction of the alkoxy silane with the substrate.

The coating solution may be applied to the glass surface via a spraying technique, that is, application as an aerosol, or the surface may be flooded with the solution or it may be applied mechanically by application from a damp cloth or other means. It is necessary that the solution be applied over the whole surface to be coated and be applied at a relatively uniform depth.

Once the coating solution is applied, then the coating is monitored to determine the appropriate end point at which the excess solution is to be removed. Determination of the proper end point is a unique feature of the instant invention. The end point to be determined is that point when a complete continuous film of silane has reacted with the substrate. An alkoxy silane reacted with the substrate forms a transparent, durable film. However, permitting the coating solution to remain on the glass surface beyond the complete reaction of a monolayer of silane compound with the glass surface can result in a deleterious film having a cloudy appearance or greasy characteristic or texture including tackiness.

The greasy condition is believed to be the result of homopolymerization of excess silane compound. This homopolymerization results in an increase in viscosity and a change in the appearance and texture of the coating. Thus, the end point is determined at that point which the viscosity begins to increase or at which moment the film begins to become cloudy. This end point may be determined physically by close examination of the film with a viscosimeter, with a dosimeter or by the unaided eye of a skilled applicator. A viscosimeter determines the viscosity of the film, while a light dosimeter determines the optical qualities, that is, the cloudiness or light transmissivity of the coating.

As indicated elsewhere herein, the elapsed time between application of the coating solution and the moment when the excess should be wiped off will vary depending upon the temperature, humidity and other variables associated with the glass substrate and other ambient conditions. Thus, the use of a rigorous method which determines the appropriate end point, regardless of the ambient or surface conditions, is essential. Monitoring of the viscosity and/or optical properties of the coating provides such a determination.

EXAMPLE

A relatively new glass substrate was coated to form an optically clear, durable coating from a dimethyl silane diethoxy solution containing 0.25% by weight sulfuric acid. The glass surface was first cleaned with alcohol. The alcohol-cleaned surface may be further cleaned as necessary for new glass. The glass surface is dried with an appropriate cloth and the coating solution is applied by an appropriate spray or other satisfactory technique to form a continuous film of solution upon the glass. At ambient coating temperatures and moderate relative humidity, the excess solution should generally be removed in about ten to about fifty seconds after the coating solution is applied to the glass. The exact moment to remove the solution occurs when the viscosity of the solution on the glass surface begins to increase.

In this instance the viscosity change was monitored by periodically drawing a narrow spatula (one-half inch wide) with a square end across the liquid coating to form a channel (groove) in the liquid. The time required for the two banks of the channel to close over the channel (the channel disappears) was timed with a stop watch. From prior trial and error tests, it had been determined that the proper end point occurred when it took the channel from about three to about five seconds to "heal" over. When this proper end point is determined, the excess solution is quickly wiped off with a cotton towel and the coating surface is wiped with a cloth saturated with denatured alcohol to remove any unattached polymeric material, i.e., any greasy material. This prompt removal of excess solution provides an adherent, transparent, water-repellent coating.

Although the time between application of the coating solution to a vitreous substrate and the occurrence of the end point may vary considerably due to various conditions of humidity and temperature, the end point determination conducted as set forth in the above example will give an accurate indication of the end point, and the "healing" time for a channel made with a one-half inch wide spatula will be comparable regardless of humidity or temperature. This technique depends upon the viscosity and determines the necessary end point by timing the duration required for the two walls of the channel or groove to meld together. This end point test was experimentally determined by trial and error, initially, on a number of coatings to conclude empirically what time duration was the appropriate elapsed time for "healing" of a one-half inch wide channel. It was found that if the excess solution was wiped off when the channel healing time was less than about three seconds, then the resulting film was not continuous and fully formed. If the time duration was in excess of about five seconds, then the excess solution caused a film which was greasy in appearance and difficult to remove and had a tacky, unacceptable surface. When such an unsatisfactory film is formed, then the whole coating must be removed, the glass properly cleaned to be free of dirt, grease or remaining defective film and then recoated.

What is claimed is:

1. A method of applying a transparent film of a silane composition to a siliceous substrate comprising:

1) applying an amount of a silane compound, having at least one reactive alkoxy group, and an acid to a substrate sufficient to form a caring on said substrate;

2) determining the end point when said silane compound has reacted to form at least a substantially complete reacted monolayer on said sub and initial homopolymerlzation of said silane compound is occurring; and 3) removing substantially all unreacted silane compound and homopolymerized silane material immediately following determination of said end point whereby a durable transparent, optical quality layer of silane compound reacted with said substrate remains.

2. The method of claim 1, wherein said end point is determined by an increase in viscosity of said film indicative of homopolymerization.

3. A method for determining the initiation of homopolymerization of a reactive silane compound in admixture with an acid on a substrate containing reactive sites comprising monitoring the viscosity of a liquid film formed on said substrate by reacted silane compound and upon detecting an increase in said viscosity indicative of homopolymerization, then removing excess silane compound which remains unreacted with said substrate and removing any silane homopolymers.

4. The method of claim 3, wherein the monitoring of viscosity is performed by periodically drawing a spatula of selected width across the liquid film to form a channel in said liquid film and timing the closing over of said channel, the end point of silane compound reaction with said substrate being that time which had been established as indicating the initiation of homopolymerization of said silane.

5. The method of claim 4, wherein said end point is a time range of about three to about five seconds for the closing over of the channel formed by a square-end spatula having a width of one-half inch.

6. The method of claim 3 wherein said monitoring of said viscosity is performed using a viscosimeter.

7. The method of claim 3 wherein said monitoring of said viscosity is performed using an optical dosimeter to detect the initiation of reduced optical clarity in said liquid film.

8. A method of applying a transparent film of a silane composition to a siliceous substrate comprising:

1) applying a silane compound, having at least one reactive alkoxy group, and an acid mixture to a substrate in an mount sufficient to produce a coating on said substrate;

2) reacting said silane compound and acid mixture with said substrate to form a reacted monolayer which is at least substantially complete;

3) determining the end point when said silane compound and acid mixture has formed said reacted monolayer on said substrate and determining initiation of homopolymerization of said silane compound and acid mixture by forming a channel in said silane compound and acid mixture using a member having a flat edge with a thickness dimension and determining the time lapse between formation and closure of the channel; and 4) removing substantially all of said unreacted silane compound and homopolymerized silane material following determination of homopolymerization initiation whereby a durable transparent, optical quality layer of silane compound reacted with said substrate remains.

9. The method of claim 8 wherein said thickness dimension of said flat edge of said member is one-half inch and said time lapse is from about 3 seconds to about 5 seconds.

* * * * *